United States Patent [19]

Towsend

[11] 4,172,333

[45] Oct. 30, 1979

[54] WRITING AND DISPLAY APPARATUS

[76] Inventor: Marvin S. Towsend, 1365 Potomac Heights Dr., Oxon Hill, Md. 20022

[21] Appl. No.: 829,142

[22] Filed: Aug. 30, 1977

[51] Int. Cl.$^2$ ............................................. G09F 13/22
[52] U.S. Cl. ..................................................... 40/544
[58] Field of Search ............... 35/66; 250/458, 461 R; 40/612, 542, 544, 584

[56] References Cited

U.S. PATENT DOCUMENTS

| | | | |
|---|---|---|---|
| 1,383,082 | 6/1921 | Dodds | 40/542 |
| 3,443,332 | 5/1969 | Christy | 40/134 |
| 3,509,644 | 5/1970 | Santell et al. | 35/66 |
| 3,559,307 | 2/1971 | Barrekette et al. | 40/545 X |
| 3,617,325 | 11/1971 | Spokes et al. | 35/66 X |
| 3,676,677 | 7/1972 | Condas et al. | 250/461 X |
| 3,836,243 | 9/1974 | Melchior | 353/122 |
| 3,960,753 | 6/1976 | Larrabee | 252/299 |

OTHER PUBLICATIONS

Journal of Applied Physics, vol. 47; No. 6; Jun. 1978; pp. 2378-2381.
Applied Physics Letters; vol. 17, No. 2; 7-15-70; pp. 51-52-53.
Journal of Applied Physics; vol. 45; No. 11; Nov. 1974; pp. 4718-4723.
Applied Physics Letters; vol. 14; No. 7; 4-1-1969; pp. 208, 209.

Primary Examiner—Louis G. Mancene
Assistant Examiner—Wenceslao J. Contreras

[57] ABSTRACT

A writing and display apparatus which includes a unified writing and display surface exhibiting a reference luminosity; and a hand-held write/erase instrument which is used to apply writing energy to said surface of reference luminosity thereby causing writing to be displayed and retained for an appropriate length of time, and which is also used to apply erasing energy directly to said retained, displayed writing thereby causing the writing to be erased.

10 Claims, 5 Drawing Figures

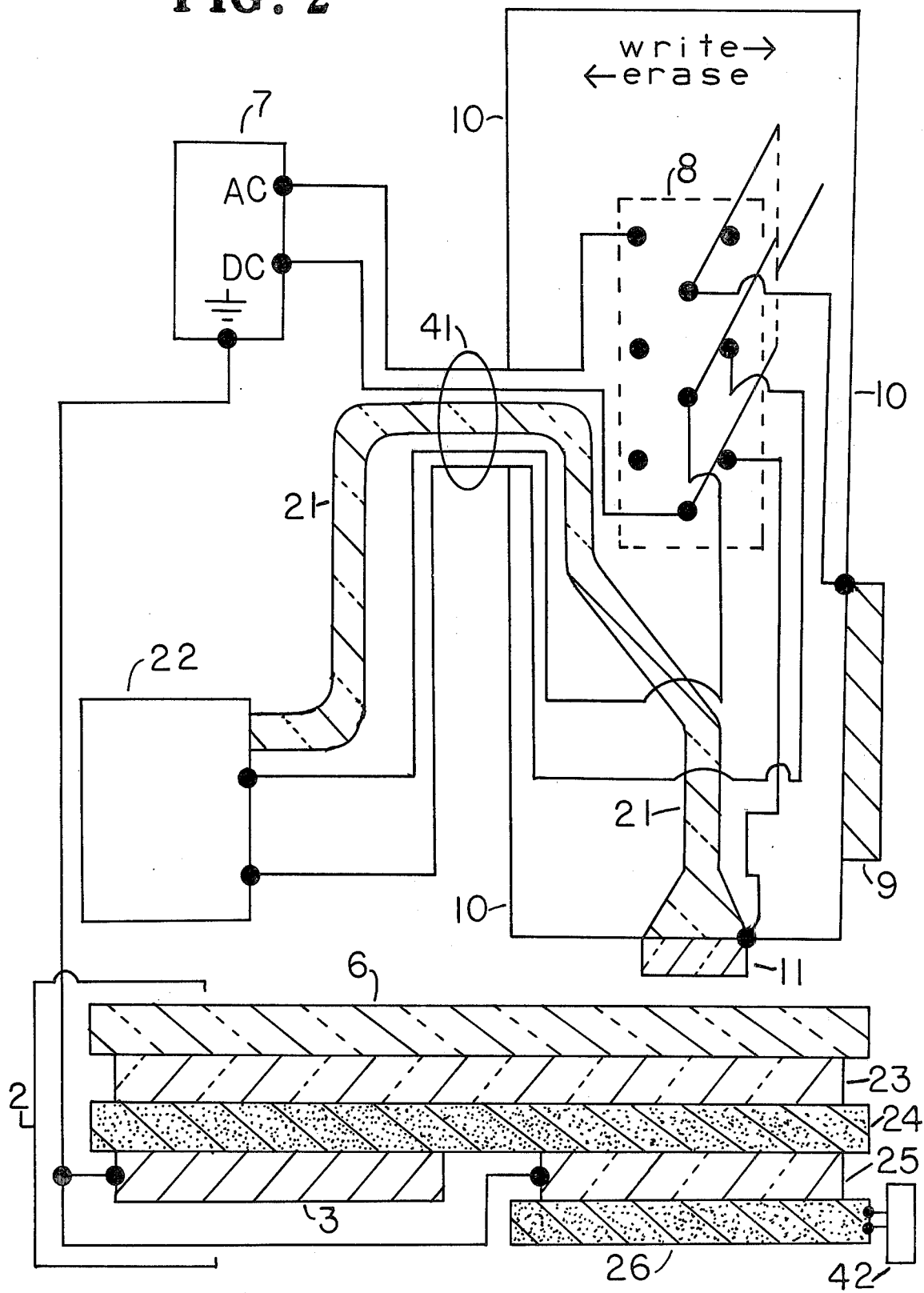

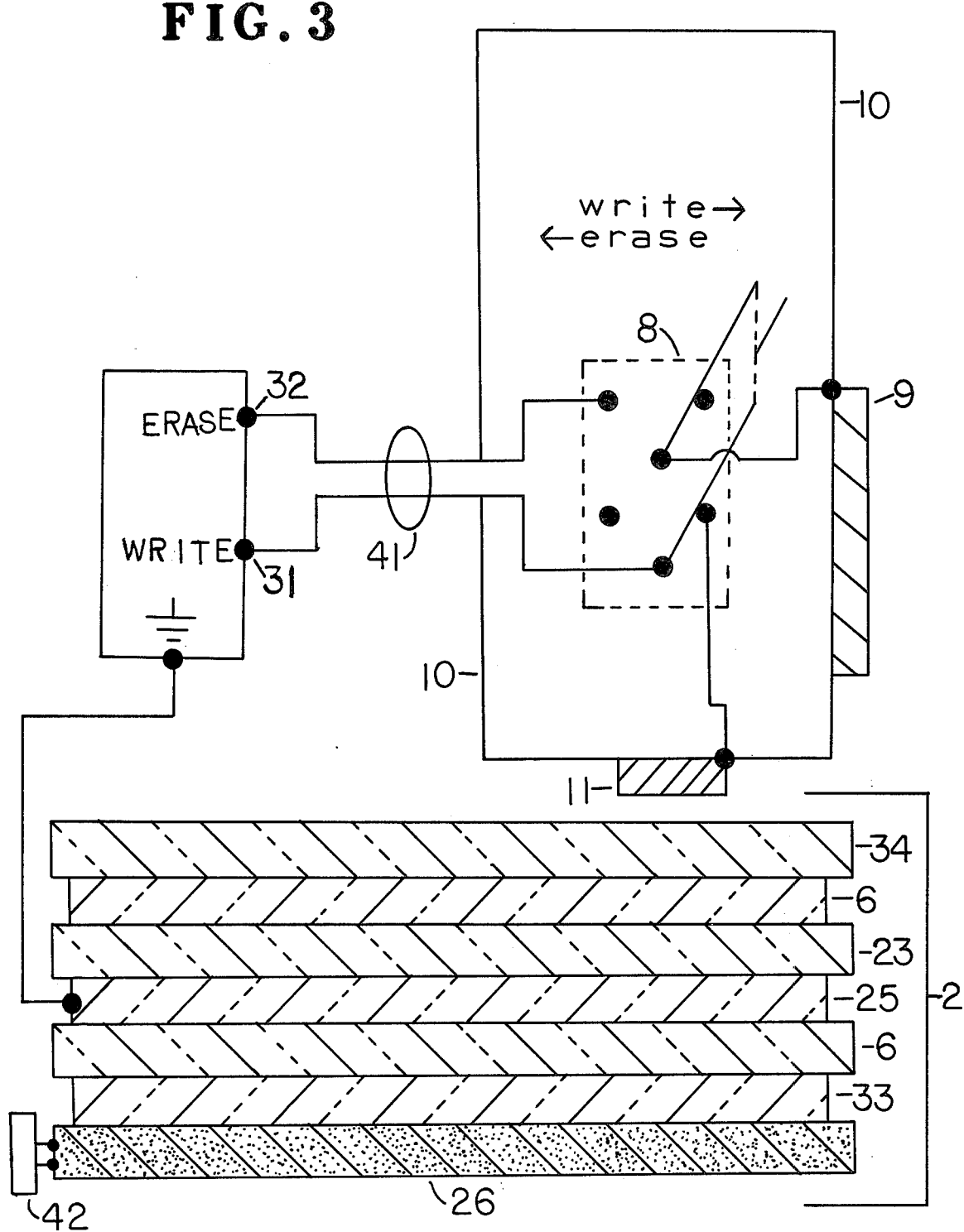

WRITING AND DISPLAY APPARATUS

BACKGROUND OF THE INVENTION

In the prior art of writing and its display, in which a hand-held writing instrument and a writing display surface are used, two different modes are employed, either application of material or application of energy. For the application of a writing material upon the material of a writing display surface, common writing materials are graphite, ink, wax, and chalk. Common hand-held instruments are pens, pencils, crayons, and chalk sticks. Common materials for the writing display surface are paper, glass, and slate.

For writing by the application of energy, a hand-held instrument is used for supplying energy for interacting with material associated with a surface of reference luminosity thereby exhibiting a visual contrast between the luminosity of the writing and the luminosity of the reference surface.

This energy application mode of writing is further divided into two classes based upon the type of energy supplied by the hand-held instrument. In the first class of the energy application mode of writing, contact force of the hand-held instrument upon the writing display surface causes a translation of material which provides for an alteration in the luminosity of the reference surface. Common examples are writing on clay or wax tablets using pointed stylus as hand-held instrument.

In the second class of the energy application mode of writing, the energy supplied by the hand-held instrument to the surface of reference luminosity is by means other than physical contact force; that is, the energy supplied is field energy or wave energy. Prior art shows that electromagnetic wave energy of various wavelengths has been used for writing on display surfaces whose luminosity is altered by interaction with electromagnetic wave energy. Examples of such prior art devices are found in Christy U.S. Pat. No. 3,443,332 issued May 13, 1969 and Melchior U.S. Pat. No. 3,836,243 issued Sept. 17, 1974.

However, the prior art devices do not provide for selective, local erase of displayed writing on the display surface by direct application of a hand-held erasing instrument in close proximity to the writing.

In view of the above, it is an object of the present invention to provide a writing and display apparatus which includes a hand-held write/erase instrument having means for transferring energy for writing either magnetic field or electric field energy or electromagnetic wave energy, to a writing and display surface of reference luminosity thereby effecting writing which is retained for an appropriate length of time; and said hand-held write/erase instrument having further means for transferring energy of erasing to written-upon regions when placed in close proximity to such displayed regions thereby effecting a selective, local erasure of the writing and a return of the luminosity of the written-upon regions to that of the reference luminosity.

Yet another object of the invention is to provide a writing and display apparatus which includes hand-held write/erase instrument and which, for erasing, does not require removal of a writing material from the display surface, such as chalk from a blackboard with its attendant dust and cleaning problems.

SUMMARY OF THE INVENTION

The invention is a writing and display apparatus which includes: a unified writing and display surface exhibiting a reference luminosity; and a hand-held write/erase instrument which is used to apply writing energy through a writing energy transmission means to said surface of reference luminosity thereby causing writing to be displayed and retained for an appropriate length of time, and which is also used to apply erasing energy directly to said retained displayed writing through an erasing energy transmission means thereby causing the writing to be erased.

The novel features characteristic of the invention both as to its organization, method of operation, and methods of application together with additional objectives, features, and advantages thereof will best be understood by the description presented below when read in connection with the accompanying drawing.

Although several specific embodiments of the invention have been selected for illustration in the drawing, and although the description presented below relates especially to these specific illustrated embodiments of the invention, this description is not intended to limit the scope of the invention which is defined in the claims.

DESCRIPTION OF THE DRAWING

FIG. 2 and FIG. 3 show two other embodiments of the invention with section views of the hand-held write/erase instrument and the writing and display surface of reference luminosity.

DETAILED DESCRIPTION OF THE INVENTION

Within the principles of the invention a large variety of embodiments are possible. The variations of embodiments depend mainly on the choices made for the type of writing energy, the elements comprising the writing and display surface of reference luminosity, and the type of erasing energy. For different sets of writing energy, surface of reference luminosity, and erasing energy there may be different physical laws and phenomena employed.

Figure 1A:
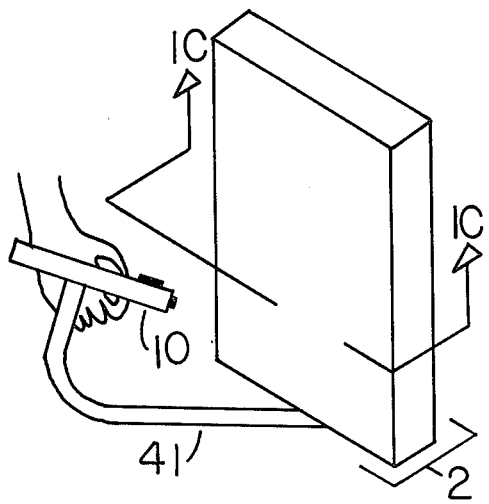
FIG. 1A shows a perspective view of one embodiment of the invention of a writing and display apparatus.
Figure 1B:
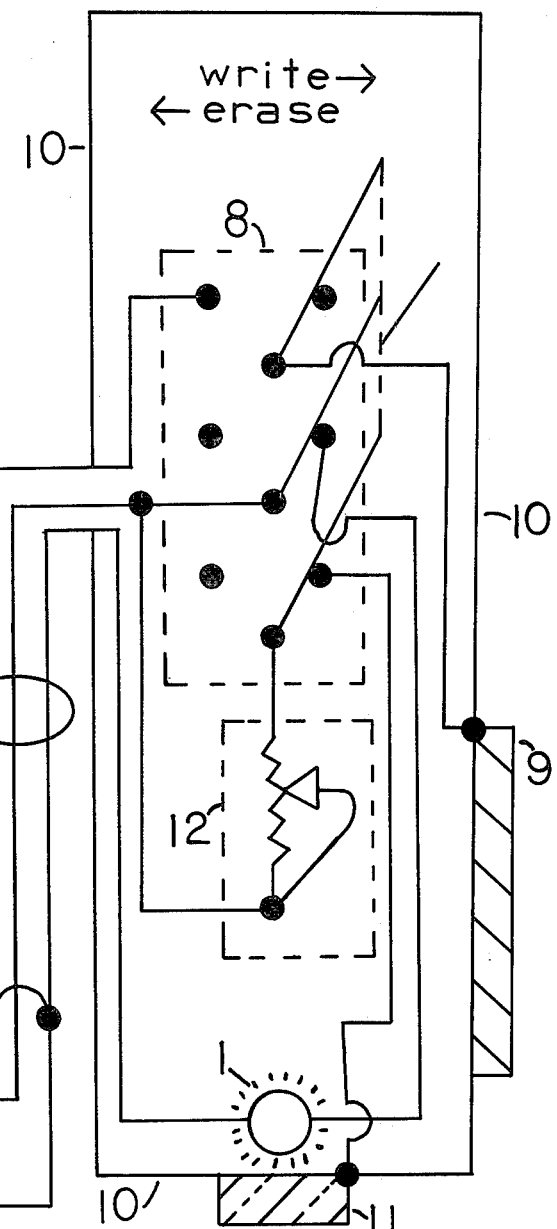
FIG. 1B shows the power supply and a section view of the hand-held write/erase instrument used in the embodiment of the invention shown in FIG. 1A.
Figure 1C:
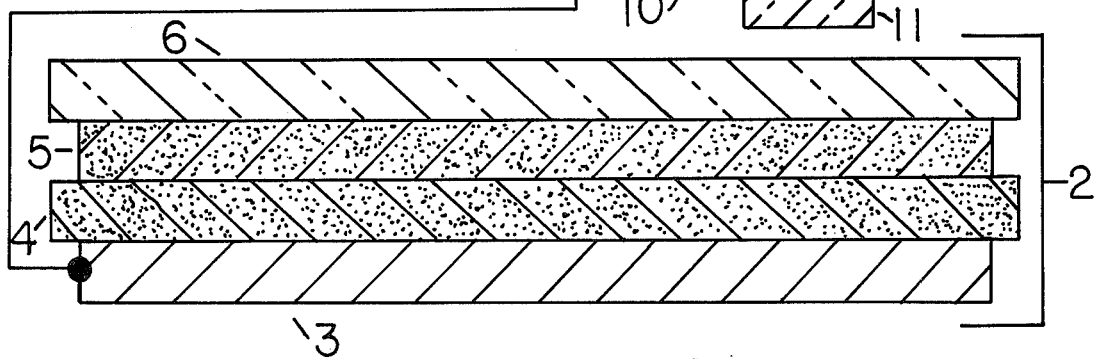
FIG. 1C shows a section view of the writing and display surface of reference luminosity of the embodiment of the invention shown in FIG. 1A.

In FIGS. 1A, 1B, and 1C an embodiment of the invention is illustrated in which the writing energy is visible light energy supplied by a visible light energy source 1 which is housed in the hand-held write/erase instrument 10. The writing and display surface of reference luminosity 2 is a four-layered panel comprised of a reflective, electrically conductive panel 3, a layer of photovoltaic semiconductor material incorporated with phosphorescent material 4, a layer of phosphorescent material 5, and glass plate 6. The erasing energy is DC voltage supplied by power supply 7, through write/erase mode switch 8 which is housed in hand-held instrument 10, through the erasing energy transmission means which is electrode 9 which is attached to the hand-held write/erase instrument 10, and to the reflective, electrically conductive panel 3.

In the embodiments described below, the viewer of the displayed writing is always looking toward the writing and display surface of reference luminosity 5 from the direction of the application of the writing energy.

In the operation of the embodiment illustrated in FIGS. 1A, 1B, and 1C, write/erase mode switch 8 is in the "write" position. Light energy source 1 is "on." Light exits from the hand-held write/erase instrument 10 through the writing energy transmission means which is transparent electrode tip 11 and falls on the writing and display surface of reference luminosity 2 thereby causing writing to appear as bright writing on a dark background. Within the writing and display surface of reference luminosity 2, the light passes through glass plate 6 and impinges on phosphorescent material 5 causing it to glow. phosphorescence is further enhanced by maintaining transparent electrode tip 11 in positive bias with respect to reflective, electrically conductive panel 3. By placing transparent electrode tip 11 in contact with glass plate 6 when writing, the light is absorbed by the layer of photovoltaic semiconductor material incorporated with phosphorescent material 4, and the phosphorescence that is inhibited is of substantially greater intensity and persists for a substantially greater period of time than that which would be visible if only a layer of phosphorescent material 5 were used not having in close proximity a photovoltaic semiconductor incorporated with phosphorescent material 4. Variable intensity control 12 is used to control the degree of bias between transparent electrode tip 11 and the reflective, electrically conductive panel 3 thereby controlling the intensity and persistence period of the phosphorescence of the displayed writing.

To effect erasure, write/erase mode switch 8 on the hand-held instrument 10 is placed in the "erase" position. In this position, the erasing energy transmission means which is erasing electrode 9 on the hand-held write/erase instrument 10 is in negative bias with respect to the reflective, electrically conductive panel 3. When erasing electrode 9 is held up against glass plate 6 directly over the written-upon regions of phosphorescent material, the reversed polarity causes the phosphorescence to disappear thereby effecting erasure.

A cable 41 connects the power supply 7 with the hand-held write/erase instrument 10.

The reflective, electrically conductive panel 3 may simply be a shiny, chromium-plated metal sheet.

The layer of photovoltaic semiconductor material incorporated with phosphorescent material 4 may be composed of known photovoltaic semiconductor materials such as materials containing a cesium antimony compound, for example cesium antimonide, chemically interconnected with a phosphor of zinc sulfide, copper activated with a chloride coactivator, for example the known P-7 phosphor composition, which may be deposited or formed on the reflective, electrically conductive panel 3 by known processes such as by known oxidation-reduction processes, electroplating, or electrostatic spraying.

The material selected composing the layer of phosphorescent material 5 is chosen taking into account the desired length of persistence and the desired level of emission in the visible spectrum. One such material is zinc sulphide, copper activated with a chloride coactivator, one satisfactory example of which is the phosphorescent compound commercially designated P-7 phosphor. The layer of phosphorescent material 5 may be superimposed on the layer of photovoltaic semiconductor incorporated with phosphorescent material 4 by known methods such as spraying or sedimentation processes.

Additional data relevant to this embodiment of the invention can be found in the aforementioned U.S. Pat. No. 3,443,332 of Christy.

In the embodiments of the invention described below, several optical properties of liquid crystalline materials are utilized. It is well known that optical transparency or optical scattering of liquid crystalline materials can be altered by application of a variety of types of energy such as electromagnetic, electric field, heat, and magnetic field energy. Selected energy effects on liquid crystalline materials are employed in embodiments of the invention described below.

In FIG. 2 the writing energy is electromagnetic energy. When laser energy is used, a flexible optical waveguide 21, either solid core or liquid core, can be used to transmit the laser energy from the laser generator 22 to the transparent electrode tip 11 of the hand-held write/erase instrument 10. A cable 41 connects the hand-held write/erase instrument 10 with the laser generator 22 and the power supply 7.

The writing and display surface of reference luminosity 2 is comprised of four layers. A glass sheet 6 covers liquid crystalline material layer 23 which covers an appropriate electromagnetic energy absorbing layer 24 which covers a reflective, electrically conductive panel 3. Optionally, the reflective, electrically conductive panel 3 can be replaced by a transparent electrode 25 which then covers a light source such as an electroluminescent panel 26 which is powered by power source 42. From FIG. 2, two distinct modes of operation of the invention are apparent: the reflective mode wherein ambient light at the front is the sole source of illumination of the surface of reference luminosity; and the transmissive mode wherein a source of illumination is provided from behind the writing and display surface of reference luminosity.

When UV electromagnetic energy is used for writing, write/erase mode switch 8 is in "write" position, and power supply 7 is connected to transparent electrode tip 11 and to reflective, electrically conductive panel 3 supplying a voltage drop across the writing and display surface of reference luminosity 2. When UV energy is emitted and directed through the transparent electrode tip 11, through the glass sheet 6, and through the liquid crystalline layer 23, it is absorbed by the electromagnetic energy absorbing layer 24, which for UV energy could be zinc sulphide. The resistance of zinc sulphide is dramatically lowered in the presence of UV energy causing a larger portion of the voltage drop to occur across the liquid crystalline layer 23 thereby heating it and altering its optical transmission properties. After cooling of the liquid crystalline material, the altered optical transmission properties are passively retained until a subsequent time when erasing energy is applied. A suitable liquid crystalline material is obtained by mixing 8% by weight of cholesteryl chloride with 92% by weight of p-methoxybenzylidene-p-n-butylaniline (MBBA).

Erasure of the written-upon regions of the liquid crystalline material 23 can be effected by applying erasing energy directly to the writing and display surface by switching write/erase mode switch 8 to "erase" position and by passing hand-held write/erase instrument 10 directly over the written-upon regions. The erasing energy is an AC electric field which is applied across the erasing electrode 9, the written-upon regions of the liquid crystalline material 23, and the relfective, electrically conductive panel 3. In the erase mode, the laser generator 22 is deenergized by the write/erase mode switch 8. A suitable AC field for erasing is 50–80Vrms at 1–10KHz. A good source of information relative to UV energy and liquid crystalline material display systems is an article entitled "Reversible Ultraviolet Imaging with Liquid Crystals," by J. D. Margerum, J. Nimoy, and S. Y. Wong appearing in Applied Physics Letters, Vol. 17, pages 51–53, July 15, 1970.

Another embodiment of the invention can be obtained by making deletions and additions in certain elements illustrated in FIG. 2. Deletion of laser generator 22 and flexible optical waveguide 21 would leave the DC electric field as the sole writing energy. Addition of a guest pleochroic dye (that is a dye whose color depends upon the spatial orientation of its molecules) to the host liquid crystalline material substantially increases the contrast ratio of written to unwritten regions of the writing and display surface of reference luminosity 2. Erasing energy would still be obtained by using AC field energy. A suitable host liquid crystalline material is obtained by adding 85–95% by weight of a mixture of equal parts n-p-butoxy, n-p-hexyloxy, and n-p-octanoyloxy-benzylideneaminobenzonitrile to 5–15% by weight of the active amyl ester of cyanobenzylideneaminocinnamic acid. A suitable guest pleochroic dye is one obtained by reacting the diazonium salt of 5-nitro-2-amino-thiazole with N-phenyl pyrolidine. A good source of information relative to the use of guest pleochroic dyes in host liquid crystalline material displays is an article entitled "New Absorptive Mode Reflective Liquid Crystal Display Device," by D. L. White and G. N. Taylor appearing in the Journal of Applied Physics, Vol. 45, No. 11, pages 4718–4723, Nov. 1974.

In FIG. 3, yet another embodiment of the invention is illustrated. Here the hand-held write/erase instrument 10 has the write electrode tip 11 connected through write/erase mode switch 8 to writing energy AC power source 31. Erase electrode 9 is connected through write/erase switch 8 to erasing energy AC power source 32.

The writing and display surface of reference luminosity 2 is seen to be comprised of seven layers. An electroluminescent panel 26 serves as a light source powered by power source 42. A first polarizing sheet 33 plane polarizes the light from light panel 26 in one plane. A first glass plate 6 is coated with a transparent electrode 25. Liquid crystalline material layer 23 is comprised of a cholesteric mixture having negative dielectric anisotropy. A second glass plate 6 and a second plane polarizing sheet 34 complete the writing and display surface of reference luminosity 2. When first and second polarizing sheets 33 and 34 are parallel, writing appears as dark writing on a light background. When first and second polarizing sheets 33 and 34 are crossed, writing appears as light writing on a dark background. A suitable liquid crystalline material is a mixture of 90% MBBA and 10% cholesteryl nonanoate (CN). A suitable writing energy AC field is 30 Vrms at less than 1KHz. A suitable erasing energy AC field is 100Vrms at greater than 2KHz.

Yet another embodiment of the invention is obtained by making an addition to the embodiment of the invention illustrated in FIG. 3. Referring back to FIG. 2, a laser generator 22 and a flexible optical waveguide 21, either solid core or liquid core, are added so that the hand-held write/erase instrument 10 becomes a light source. Using an IR laser for writing energy, the liquid crystalline material 23 is heated and then cooled while still retaining a disordered state after cooling. The written regions can be erased by application of an AC field such as 40Vrms at 1.5KHz between the erase electrode 9 on the hand-held write/erase instrument 10 and the transparent electrode 25 in the writing and display surface of reference luminosity. Additional information relevant to this embodiment can be found in the aforementioned U.S. Pat. No. 3,836,243 of Melchior.

Still another embodiment of the invention can be obtained by making use of magnetic field energy as the writing energy. In an article entitled "Distortion of a Cholesteric Structure by a Magnetic Field," by R. B. Meyer appearing in Applied Physics Letters, Vol. 14, No. 7, pages 208–209, Apr. 1, 1969, the cholesteric to nematic phase transition in a cholesteric liquid crystalline material is demonstrated to occur in a magnetic field whose intensity is in the vicinity of 9 kiloguass (kG). Readily available permanent alloys exhibit remanence of more than 9 kG up to greater than 13 kG. The hand-held write/erase instrument 10 would house a permanent magnet for writing and an electrode 9 for application of an AC electric field for erasing. Such an embodiment would resemble the embodiment of the invention illustrated in FIG. 3 with the exception that the writing energy would be transmitted by way of the permanent magnet to the writing and display surface of reference luminosity without the need for electrical energization.

Improved performance of several of the embodiments of the invention described above may be obtained by taking advantage of recent and future advances in the art of liquid crystalline materials. In order to enhance the contrast ratio between written-upon and un-written-upon areas of the writing and display surface of reference luminosity, fluorescent solutes such as disclosed in Larrabee U.S. Pat. No. 3,960,753 issued June 1, 1976 may be added to liquid crystalline solvents and used in place of non-fluorescent liquid crystalline material. In order to extend the service life of certain liquid crystalline materials, dopant materials, such as described in an article entitled "Dynamic Scattering in Nematic Liquid Crystals under DC Conditions.II. Monitoring of Electrode Processes and Lifetime Investigation," by S. Barret, F. Gaspard, R. Herino, and F. Mondon appearing in the Journal of Applied Physics, Vol. 47, No. 6, pages 2378–2381, June 1976, may be employed.

In the embodiments of the invention employing a flexible optical waveguide, whether of solid core or liquid core, the waveguide may be in the form of a spiral wound spring.

What is claimed is:

1. A writing and display apparatus, comprising:
    a. a writing energy source for supplying writing energy to a hand-held write/erase instrument;
    b. an erasing energy source for supplying erasing energy to a hand-held write/erase instrument;
    c. a hand-held write/erase instrument, connected to said writing energy source and said erasing energy source, which houses a write/erase mode switch and which includes a writing energy transmission means and an erasing energy transmission means for transmitting writing and erasing energy from said writing energy source and said erasing energy source to a writing and display surface, said erasing energy transmission means having the property of being electrically conductive;

d. a writing and display surface of reference luminosity which includes plural continuous coextensive layers of material, a first layer of material which receives writing energy from said hand-held write/erase instrument and which has the property of retaining the writing as a contrast in luminosity between the written-upon regions and the reference luminosity;

and which also includes a second layer of material having the property of being electrically conductive and which serves in conjunction with said electrically conductive erasing energy transmission means on said hand-held write/erase instrument to apply erasing energy from said hand-held write/erase instrument across written-upon regions thereby enabling erasure of the written-upon regions.

2. A writing and display apparatus as described in claim 1 wherein:

a. said writing energy source is an electromagnetic wave source;
b. said erasing energy source is an electric field source;
c. said writing energy transmission means in said hand-held write/erase instrument is a transparent electrode tip; and
d. said erasing energy transmission means in said hand-held write/erase instrument is an electrically conductive plate.

3. A writing and display apparatus as described in claim 2 wherein:

a. said electromagnetic wave writing energy source is a visible light source;
b. said electric field erasing energy source is a DC voltage source; and
c. in said writing and display surface of reference luminosity, said first layer of material includes a component layer of phosphorescent material coextensive with a component layer of photoelectric semiconductor material for receiving writing energy from said hand-held write/erase instrument, and wherein said two coextensive component layers of material comprising said first layer of material have the property of retaining and displaying writing as a contrast in luminosity between the written-upon regions and the reference luminosity; and wherein said second layer of material includes a reflective, electrically conductive panel which serves in conjunction with said electrically conductive erasing energy transmission means on said hand-held write/erase instrument to apply erasing energy to the written-upon regions thereby enabling erasure of the written-upon regions.

4. A writing and display apparatus as described in claim 2 wherein:

a. said electromagnetic wave writing energy source is an infrared light source;
b. said erasing energy electric field source is an AC voltage source; and
c. said writing and display surface of reference luminosity includes an electrically conductive panel and a layer of liquid crystalline material.

5. A writing and display apparatus as described in claim 2 wherein:

a. said writing energy source is an ultraviolet electromagnetic radiation source in conjunction with a DC voltage source;
b. said erasing energy electric field source is an AC voltage source; and
c. said writing and display surface of reference luminosity, across which a DC voltage applied by said DC voltage source is maintained, includes an electrically conductive panel, a layer of photoresistive material, and a layer of liquid crystalline material whose optical properties are changed when heated as a result of an increased voltage drop across it which occurs when said layer of photoresistive material is impinged upon by electromagnetic radiation from said electromagnetic radiation source.

6. A writing and display apparatus as described in claim 5 wherein said writing energy transmission means is further comprised of a flexible optical waveguide connecting said writing energy source of electromagnetic radiation and said transparent electrode tip.

7. A writing and display apparatus as described in claim 1 wherein:

a. said writing energy source is a first AC voltage source;
b. said erasing energy source is a second AC voltage source;
c. said writing energy transmission means is an electrically conductive plate;
d. said erasing energy transmission means is an electrically conductive plate; and
e. said writing and display surface of reference luminosity includes an electrically conductive panel and a layer of liquid crystalline material.

8. A writing and display apparatus as described in claim 7 wherein said writing and display surface of reference luminosity further includes:

a. first polarizing sheet and a background light panel placed behind said transparent electrically conductive panel; and
b. a second polarizing sheet placed in front of said layer of liquid crystalline material.

9. A writing and display apparatus as described in claim 1 wherein:

a. said writing energy source is a DC voltage source;
b. said erasing energy source is an AC voltage source;
c. said writing energy transmission means is an electrically conductive plate;
d. said erasing energy transmission means is an electrically conductive plate; and
e. said writing and display surface of reference luminosity includes an electrically conductive panel and a layer of host liquid crystalline material having a guest pleochroic dye dissolved therein.

10. A writing and display apparatus as described in claim 1 wherein:

a. said writing energy source is a permanent magnet;
b. said erasing energy source is an AC voltage source;
c. said writing energy transmission means is a permanent magnet at the tip of said hand-held write/erase instrument;
d. said erasing energy transmission means is an electrically conductive plate; and
e. said writing and display surface of reference luminosity includes an electrically conductive panel and a layer of liquid crystalline material.

* * * * *